United States Patent
Chen et al.

(10) Patent No.: US 10,462,607 B2
(45) Date of Patent: *Oct. 29, 2019

(54) COMMUNICATION DEVICE AND COMMUNICATION METHOD FOR WIRELESS COMMUNICATIONS

(71) Applicant: SONY CORPORATION, Tokyo (JP)

(72) Inventors: Jinhui Chen, Beijing (CN); Yuxin Wei, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,335

(22) Filed: Sep. 18, 2017

(65) Prior Publication Data

US 2018/0007513 A1 Jan. 4, 2018

Related U.S. Application Data

(62) Division of application No. 14/988,797, filed on Jan. 6, 2016, now Pat. No. 9,813,869.

(30) Foreign Application Priority Data

Feb. 15, 2015 (CN) .......................... 2015 1 0083127

(51) Int. Cl.
*H04W 4/02* (2018.01)
*G01S 5/12* (2006.01)
*H04W 64/00* (2009.01)

(52) U.S. Cl.
CPC ........... *H04W 4/025* (2013.01); *H04W 64/00* (2013.01)

(58) Field of Classification Search
CPC ....... H04W 4/025; H04W 64/00; H04W 4/02; H04W 4/22; H04W 84/12; G01S 5/0284; G01S 5/0236; G01S 5/02
(Continued)

(56) References Cited

U.S. PATENT DOCUMENTS 9,055,450 B2 * 6/2015 Hand .................... H04W 24/00
9,097,552 B2 8/2015 Udeshi
(Continued)

OTHER PUBLICATIONS

Stephen Edge et al OMA-LOC-2012-0113R01-CR_LPPe_1.1_TS Broadcast Ciph erring, Jun. 29, 2012 (Jun. 29, 2012), pp. 1-74, XP064167778. Retrieved from the Internet <URL:ftp/Public_documents/LOC/2012 [retrieved on Jun. 29, 2012] Jun. 29, 2012.

*Primary Examiner* — Khawar Iqbal
(74) *Attorney, Agent, or Firm* — Xsensus, LLP

(57) ABSTRACT

The present disclosure provides a communication device for wireless communication systems and a communication method for the communication device. The communication device includes: one or more processors, configured to determine information of a reference geographical location used for the communication device, and generate, based on the information of the reference geographical location and a current absolute geographical location of the communication device, information of a relative geographical location of the communication device with respect to the reference geographical location; and a communication unit, configured to transmit the information of the relative geographical location to a predetermined communication object.

15 Claims, 7 Drawing Sheets

(58) Field of Classification Search
  USPC .................................. 455/456.1–456.6, 404.2
  See application file for complete search history.

(56) References Cited

U.S. PATENT DOCUMENTS

| | | | | |
|---|---|---|---|---|
| 9,408,030 | B1* | 8/2016 | Spain, Jr. | H04W 4/025 |
| 9,554,247 | B2 | 1/2017 | Jones | |
| 9,602,962 | B2* | 3/2017 | Edge | H04W 4/021 |
| 9,668,099 | B2* | 5/2017 | Davydov | H04W 4/023 |
| 2012/0136623 | A1* | 5/2012 | Edge | G01S 5/0284 |
| | | | | 702/150 |
| 2015/0219750 | A1* | 8/2015 | Xiao | G01S 5/14 |
| | | | | 342/451 |
| 2015/0271646 | A1 | 9/2015 | Chang | |
| 2015/0319574 | A1 | 11/2015 | Wachter | |
| 2015/0338502 | A1* | 11/2015 | Wirola | G01S 5/0252 |
| | | | | 455/456.1 |
| 2015/0373491 | A1* | 12/2015 | Lim | G01S 5/0257 |
| | | | | 455/456.1 |
| 2016/0019797 | A1* | 1/2016 | Klang | G08G 5/0008 |
| | | | | 701/3 |
| 2016/0037301 | A1* | 2/2016 | Davydov | H04W 4/023 |
| | | | | 455/404.2 |
| 2016/0180325 | A1 | 6/2016 | Davis | |
| 2016/0180500 | A1 | 6/2016 | Barnes | |
| 2017/0034682 | A1 | 2/2017 | Matsumasa | |
| 2017/0082441 | A1 | 3/2017 | Haglund | |
| 2017/0190318 | A1* | 7/2017 | Imamura | H04W 4/023 |
| 2018/0007516 | A1* | 1/2018 | Ge | H04W 64/00 |
| 2018/0206183 | A1* | 7/2018 | Li | H04W 24/10 |
| 2018/0227876 | A1* | 8/2018 | Puthenpura | H04W 64/00 |

* cited by examiner

COMMUNICATION DEVICE AND COMMUNICATION METHOD FOR WIRELESS COMMUNICATIONS

CROSS-REFERENCE TO RELATED APPLICATION

This application is a divisional of U.S. Ser. No. 14/988,797, filed Jan. 6, 2016, and claims the benefit of priority under 35 U.S.C. § 119 from Chinese Patent Application No. 201510083127.9, filed Feb. 15, 2015, the entire contents of each of which are incorporated herein by reference.

FIELD OF THE INVENTION

The embodiments of the present invention generally relate to the field of wireless communications, particularly relate to the technique of delivering information of geographical locations, and more particularly relate to a communication device and a communication method for wireless communication systems.

BACKGROUND OF THE INVENTION

In the wireless communication systems nowadays, the base station and the terminal can not acquire knowledge of information of the relative geographical location in the link-level transmission, so as to perform optimization of techniques such as beam forming, use scheduling, pilot assignment, and so on.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present application, there is provided a communication device for wireless communication systems, including: one or more processors, configured to determine information of a reference geographical location used for the communication device, and generate, based on the information of the reference geographical location and a current absolute geographical location of the communication device, information of a relative geographical location of the communication device with respect to the reference geographical location; and a communication unit, configured to transmit the information of the relative geographical location to a predetermined communication object.

According to another aspect of the present application, there is further provided a communication method for a communication device for wireless communication systems, including: determining information of a reference geographical location used for the communication device; generating, based on the information of the reference geographical location and a current absolute geographical location of the communication device, information of a relative geographical location of the communication device with respect to the reference geographical location; and transmitting the information of the relative geographical location to a predetermined communication object.

According to an aspect of the present invention, there is provided a communication device for wireless communication systems, including: a communication unit, configured to receive information of a first relative geographical location, which is about the first relative geographical location of a communication object of the communication device with respect to a reference geographical location; and one or more processors, configured to acquire, based on the information of the first relative geographical location and the information of the reference geographical location, a current geographical location of the communication object.

According to another aspect of the present application, there is further provided a communication method for a communication device for wireless communication systems, including: receiving information of a first relative geographical location which is about the first relative geographical location of a communication object of the communication device with respect to a reference geographical location; and acquiring, based on the information of the first relative geographical location and the information of the reference geographical location, a current geographical location of the communication object.

According to other aspects of the present invention, there are further provided computer program codes and computer program product for implementing the above mentioned communication method for a communication device for wireless communication systems, as well as a computer readable storage medium on which computer program codes for realizing the aforementioned communication method for a communication device for wireless communication systems are recorded.

The communication device for wireless communication systems and the method for communication device according to the present application allow communication devices to grasp the information of the relative location of the communication object with respect to themselves via the air interface communication between them with as little overhead as possible, thereby achieving at least one of the following: assisting in various operations, further improving the performance of the wireless networks.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE INVENTION

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

The First Embodiment

Figure 1:
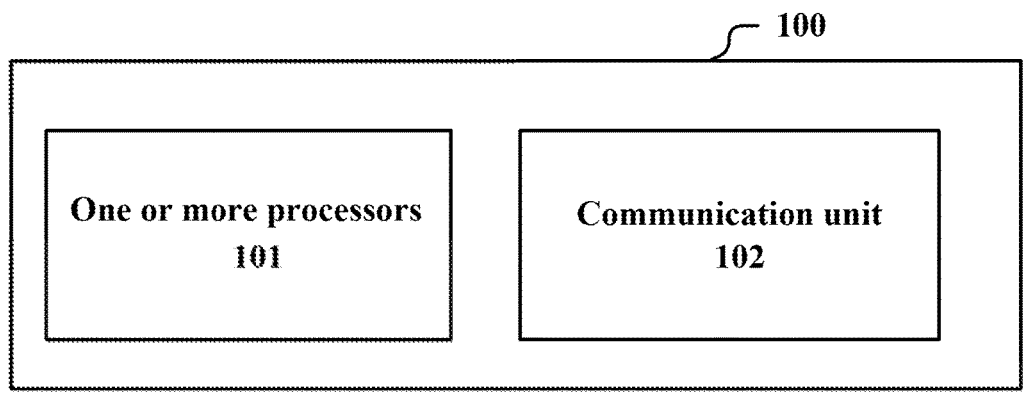
FIG. 1 is a structural block diagram illustrating the communication device for wireless communication systems according to an embodiment of the present application.

FIG. 1 illustrates a structural block diagram of a communication device for wireless communication systems according to an embodiment of the present application. The communication device 100 includes: one or more processors 101, configured to determine information of a reference geographical location used for the communication device; and generate, based on the information of the reference geographical location and a current absolute geographical location of the communication device, information of a relative geographical location of the communication device with respect to the reference geographical location; and a communication unit 102, configured to transmit the information of the relative geographical location to a predetermined communication object.

Wherein, the communication device 100 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus or a mobile base station. The communication device 100 may also be realized as a terminal (that is also referred to as a machine type communication (MTC) terminal) that performs machine-to-machine (M2M) communication. Furthermore, the communication device 100 may be a radio communication module (such as an integrated circuit module including a single die) mounted on each of the terminals.

The processor 101 can be for example a central processing unit (CPU) having data processing capability, a microprocessor, an integrated circuit module, or the like. The communication unit 102 implements information or data delivering with the predetermined communication object.

Figure 2:
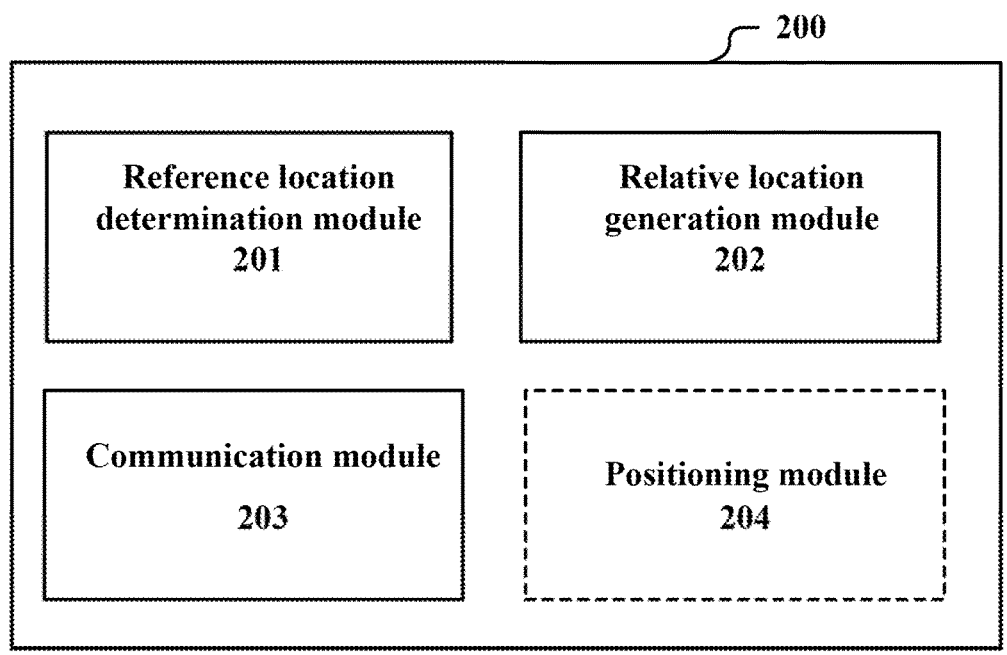
FIG. 2 is a block diagram illustrating the functional modules of the communication device for wireless communication systems according to an embodiment of the present application.

Correspondingly, FIG. 2 shows the block diagram of the functional modules of the communication device 100 (identified as communication device 200 in FIG. 2), and the functions and structures of the communication device 200 are described in detail with reference to this block diagram hereinafter. As shown in FIG. 2, the communication device 200 includes: a reference location determination module 201, configured to determine information of a reference geographical location used for the communication device; and a relative location generation module 202, configured to generate, based on the information of the reference geographical location and a current absolute geographical location of the communication device 200, information of a relative geographical location of the communication device with respect to the reference geographical location; and a communication module 203, configured to transmit the information of the relative geographical location to a predetermined communication object.

Since the absolute geographical location of the communication device requires occupying more bits of the signaling to be transmitted, it is possible to consider delivering information of a relative geographical location to the communication object. The communication object here is for example a device such as a base station of a cell, a base station of a small cell, a central controlling node or the like. Since the communication object and the communication device know the information of the absolute location of the reference geographical location in common, the communication object can acquire the absolute location of the communication device or the relative geographical location of the communication device with respect to the communication object, upon receiving the information of the relative geographical location.

The transmitting of the information of the relative geographical location by the communication module 203 can be periodical, or can be event-triggering based. For example, when the displacement of the communication device 200 or the displacement of the communication object exceeds a predetermined range, the communication module 203 triggers the transmitting.

The reference location determination module 201 can adopt various manners to determine the information of the reference geographical location, including but not limited to the manners such as receiving the information from other devices, determining according to information of itself or the like. The determination of the information of the reference geographical location will be exemplified in the following. However, it is to be noted that this is not intended to be limiting, and the selection of the reference geographical locations is not limited thereto. Instead, as long as the communication device and the predetermined communication object both can acquire the absolute geographical location of a certain location, this location can be used as the reference geographical location.

In an example, the communication module 203 is further configured to receive information of a geographical location of the predetermined communication object, and the reference location determination module 201 is configured to determine the geographical location of the predetermined communication object as the reference geographical location. Wherein, the information of the geographical location herein can be information of the absolute geographical location, or can be information of the relative geographical location such as the information of the relative location representing the deviation of the predetermined communication object with respect to the position where it is located at a preceding time point. The information of location can be denoted for example by plane coordinates such as the longitude and latitude, the longitude and latitude as well as the altitude, or polar coordinates such as the radius and angle. For example, the predetermined communication object can transmit the information of its geographical location to the communication device 200 through at least one of broadcast channel (BCCH) signaling, downlink control channel (PDCH) signaling, connection management procedure RRC signaling mapped to downlink shared channel and control element information of media access layer (MAC). In addition, in the case of the communication device 200 being a base station, the communication module 203 can further interchange the information of the geographical location by X2 signaling.

In addition, the reference location determination module 201 can further adopt the absolute geographical locations of other entities as the reference geographical locations. These entities include for example the relay nodes, base stations of small cells, representative landmark buildings, or several landmarks distributed uniformly in the coverage range of the serving base station which are specified in advance. However, it is not limited thereto. As long as the absolute geographical location of an entity is known to both the communication device 200 and the predetermined communication object, it can be used.

In another example, the communication module 203 is further configured to transmit, at different time instants, the information of its relative geographical locations at respective time instants to the predetermined communication objects respectively, and the reference location determination module 201 is configured to determine the absolute geographical location of the communication device at a first time instant as the reference geographical location at the current time instant. For example, the first time instant can be a particular time instant such as the time instant to access into the base station, and relative values with respect to the geographical location at this time instant are transmitted at respective time instants. In addition, the first time instant can be a time instant which is iteratively updated, such as the time instant when the last transmitting occurs, and relative values with respect to the location at the last time instant are transmitted at respective time instants.

Figure 3:
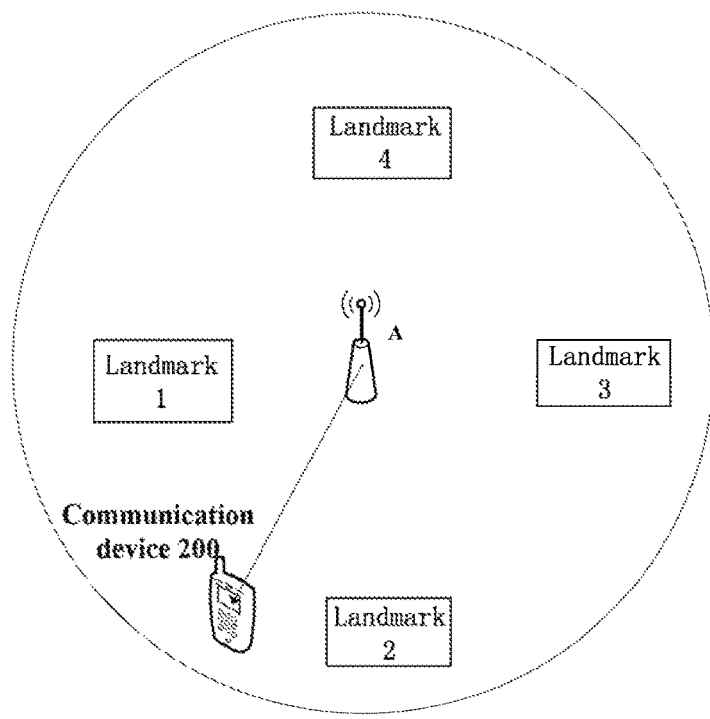
FIG. 3 is a schematic drawing illustrating examples of multiple candidate reference geographical locations.
Figure 4:
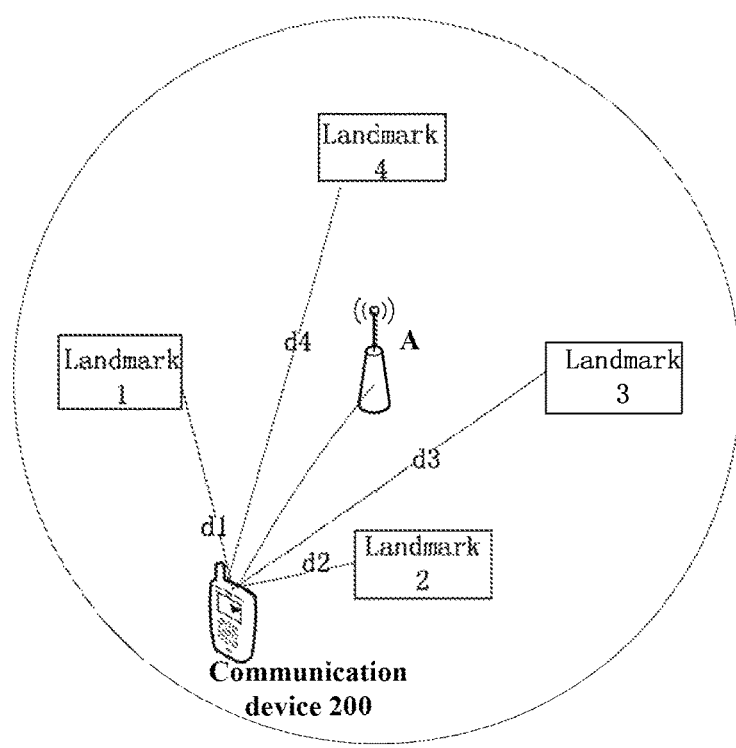
FIG. 4 is a schematic drawing illustrating an example where one of the multiple candidate reference geographical locations is selected as the reference geographical location.

In still another example, the communication module 203 is further configured to receive information of multiple absolute geographical locations serving as candidate reference geographical locations and corresponding identifiers, and the reference location determination module 201 selects, based on distances between the multiple absolute geographical locations and the communication device 200, one of the multiple absolute geographical locations as the reference geographical location. FIG. 3 shows an example where the communication device 200 receives the candidate reference geographical locations and corresponding identifiers from the central node A. Wherein, the central node A can be the serving base station, the central control node, the geographical location database, or the like. The communication device 200 receives, from the central node A, the information of the absolute geographical locations of the landmarks 1-4 which serve as the candidate reference geographical locations and the corresponding IDs. In the case that the landmarks are distributed uniformly, the ID can be the numbering of the landmark. Based on these absolute geographical locations and the absolute geographical location of the communication device 200, the reference location determination module 201 can acquire the distances d1-d4 between the communication device 200 and the landmarks 1-4 respectively, as shown in FIG. 4. For example, the reference location determination module 201 selects the landmark 2 which is nearest in distance as the reference geographical location (of course, other selecting criterion can be adopted as well). The relative location generation module 202 generates the information of relative geographical location of the communication device with respect to the landmark 2, based on the information of the geographical location of the landmark 2 and the absolute geographical location of the communication device 200. The communication module 203 transmits this information of relative geographical location and the ID of the landmark 2 to the predetermined communication object such as the central node A shown in FIG. 4.

Although it is shown here that one candidate reference geographical location is selected as the reference geographical location, multiple reference geographical locations can also be selected, and the relative location generation module 202 correspondingly determines multiple relative geographical locations. The communication module 203 can transmit information of the multiple relative geographical locations (including corresponding IDs) to the predetermined communication object, or can only transmit that of one relative geographical location after selecting.

In another example, the communication module 203 is further configured to receive information of a geographical location of a relay node on a communication link between the communication device and the predetermined communication object, and the reference location determination module 201 is configured to determine the geographical location of the relay node as the reference geographical location. The information of the geographical location of the relay node herein can be information of absolute location, or can be information of a relative location of the relay node with respect to the predetermined communication object such as the base station. If the reference geographical location is the absolute geographical location of the relay node, then after the communication module 203 transmits the obtained relative geographical location to the predetermined communication object, the predetermined communication object can acquire the absolute geographical location of the communication device 200 based on the absolute geographical location of the relay node. If the reference geographical location is the relative geographical location of the relay node with respect to the predetermined communication object, then the predetermined communication object, can calculate the absolute geographical location of the relay node based on its absolute geographical location and the relative geographical location of the relay node, and thus further acquire the absolute geographical location of the communication device based on the absolute geographical location of the relay node and the relative geographical location transmitted by the communication module 203. Generally speaking, since the relay node is nearer to the communication device, it is possible to transmit the information of the relative geographical location more accurately with the same signaling overhead.

In addition, the transmitting module 203 can further receive information of the absolute geographical location(s) of other entity(entities) such as the relay nodes, base stations of small cells, representative landmark buildings, or several landmarks distributed uniformly in the coverage range of the serving base station which are specified in advance, as long as the absolute geographical location of the entity is also known to the predetermined communication object (such as eNB), and the reference location determination module 201 is configured to determine the geographical location of this entity as the reference geographical location.

As stated above, the relative location generation module 202 generates the information of the relative geographical location based on the information of the determined reference geographical location and the current absolute geographical location of the communication device, and the communication module 203 transmits the information of the relative geographical location to the predetermined communication object.

In an example, the relative location generation module 202 is configured to calculate a difference value between the current absolute geographical location of the communication device and the reference geographical location, and quantize and encode the difference value to generate the information of the relative geographical location. As shown by a dashed line block of FIG. 2, in an example, the communication device 200 further includes a positioning module 204, configured to determine the absolute geographical location of the communication device 200. For example, the positioning module 204 can be a global positioning system (GPS) module.

The generated information of the relative geographical location can be transmitted through at least one of uplink control channel (PUCCH) signaling, RRC signaling mapped to uplink shared channel (PUSCH) and control element information of media access layer (MAC). In addition, the information of the relative geographical location can further be transmitted through physical random access channel (PRACH) signaling when the communication device 200 is initially accessed in the network.

For example, the reference location determination module 201, the relative location generation module 202, and the positioning module 204 in FIG. 2 can be implemented by the one or more processors 101 in FIG. 1, and the communication module 203 can be implemented by the communication unit 102 in FIG. 1.

The Second Embodiment

Figure 5:
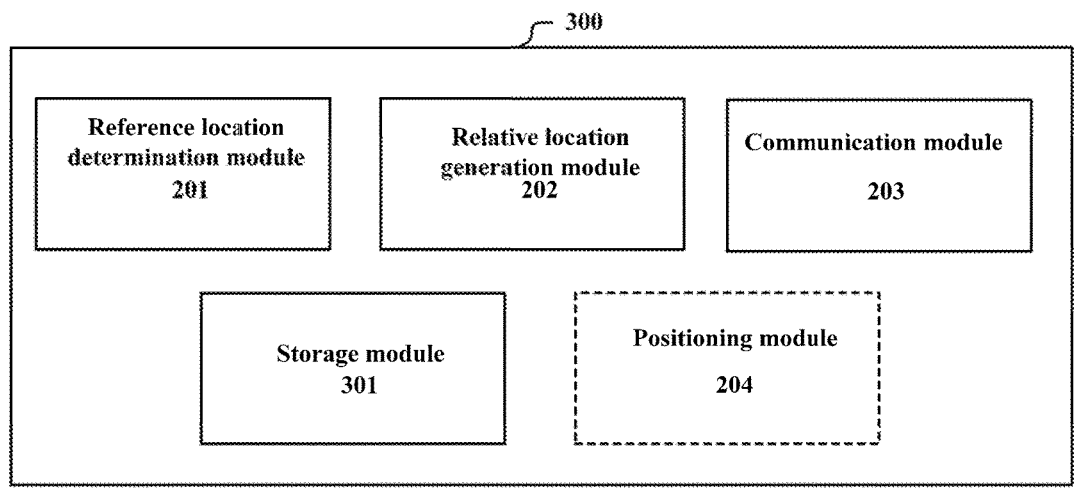
FIG. 5 is a block diagram illustrating the functional modules of the communication device for wireless communication systems according to another embodiment of the present application.

FIG. 5 shows the block diagram of the functional modules of the communication device 300 according to another embodiment of the application. Besides the modules shown in FIG. 2, the communication device 300 further includes: a storage module 301, configured to store one or more geographical location information quantization tables, and the relative location generation module 202 is configured to quantize and encode the above mentioned difference value based on a corresponding geographical location information quantization table. Wherein, the geographical location information quantization tables may be stored in advance when leaving the factory according to the communication protocol, or be received from the base station or the central control node after accessing in the network and stored. In addition, the specific encoding manner can be selected according to the used geographical location information quantization table. The storage module 301 can also be implemented for example by the one or more processors 101 in FIG. 1.

In the following, the structure of the geographical location information quantization table will be described by means of an example where the reference geographical location is the geographical location of the predetermined communication object (base station eNB).

As an example, the quantizing method in plane coordinates can be adopted. Specifically, the plane coordinates quantization table can be determined based on the range of the longitude and latitude covered by eNB and the required accuracy. The communication device calculates its relative location with respect to eNB according to its absolute geographical location and the absolute geographical location of eNB, quantizes the relative location using the plane coordinates quantization table and reports. For convenience of understanding, the following specific example is given.

Figure 6:
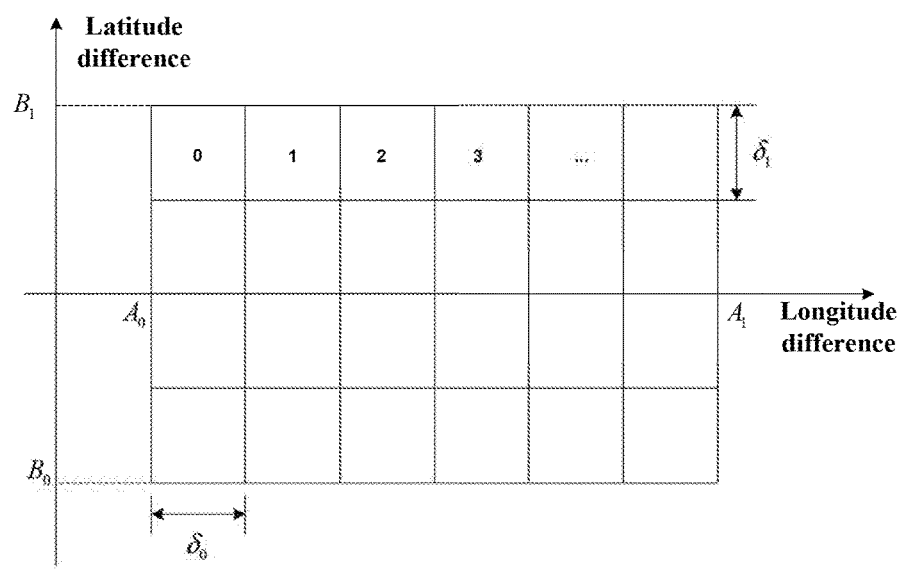
FIG. 6 is a drawing of an example of the quantization table in plane coordinates.

Assuming that the longitude position of eNB is $\alpha_{BS}$, the latitude position of eNB is $\beta_{BS}$, the coverage range in longitude is $(\alpha_{BS}+A_0, \alpha_{BS}+A_1)$, the coverage range in latitude is $(\beta_{BS}+B_0, \beta_{BS}+B_1)$, the required accuracy in longitude is $\delta_0$, the required accuracy in latitude is $\delta_1$, the defined plane coordinates quantization table is for example as shown in FIG. 6.

Assuming that the longitude position and the latitude position of the communication device are $\alpha_{UE}$ and $\beta_{UE}$ respectively, the calculated difference of longitude and difference of latitude by the communication device upon receiving the information of the longitude and latitude of the eNB are $\Delta_\alpha=\alpha_{UE}-\alpha_{BS}$ and $\Delta_\beta=\beta_{UE}-\beta_{BS}$ are respectively. The communication device takes the index value of the grid where the coordinates $(\Delta_\alpha, \Delta_\beta)$ fall as the quantization value of the relative geographical location and transmits it to the eNB.

As another example, the quantizing method in polar coordinates can be adopted. Specifically, the polar coordinates quantization table can be determined according to the coverage radius, and coverage angle of eNB, and the required accuracy. The eNB notifies the communication device of the difference value between the antenna collimation direction of the present cell and the reference direction (such as south, north, east, west and so on). The communication device calculates the polar coordinates $(r_{UE}, \theta_{UE})$ of the communication device in the polar coordinates system which is established by taking the absolute geographical location of eNB as the origin and taking the antenna collimation direction as the direction of the polar axis, according to the absolute geographical location of the communication device itself, the absolute geographical location of eNB and the antenna collimation direction, quantizes the coordinates using the polar coordinates quantization table and reports. For convenience of understanding, the following specific example is given.

Figure 7:
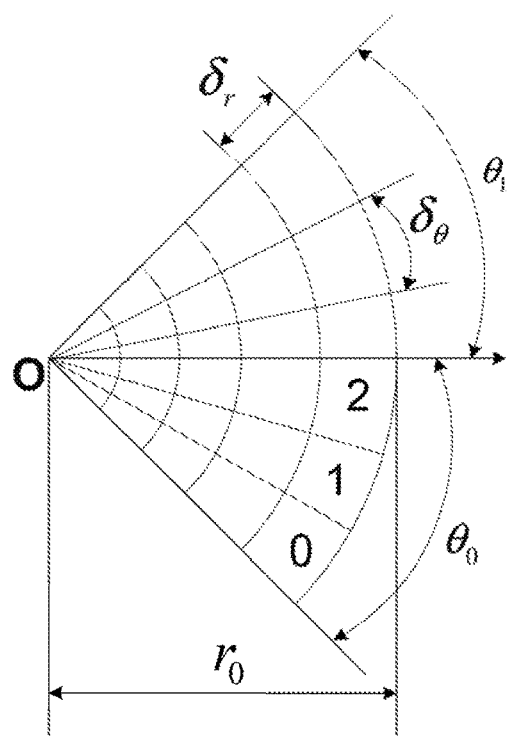
FIG. 7 is a drawing of an example of the quantization table in polar coordinates.

Assuming that the longitude position of eNB is $\alpha_{BS}$, the latitude position of eNB is $\beta_{BS}$, the angle between the collimation line of the antenna array of eNB and the north direction of the eNB is $\gamma_0$, the radius of the coverage range is smaller than or equal to $r_0$, the range of coverage angle is $(\gamma_0-\theta_0, \gamma_0+\theta_1)$, the required accuracy of polar radius is $\delta_r$, and the required accuracy of angle is $\delta_\theta$, the defined polar coordinates quantization table is for example as shown in FIG. 7.

Still assuming that the longitude position and the latitude position of the communication device are $\alpha_{UE}$ and $\beta_{UE}$ respectively, the communication device, after receiving the absolute geographical location ($\alpha_{BS}$, $\beta_{BS}$) of the eNB, calculates the polar radius $r_{UE}=\sqrt{(\alpha_{UE}-\alpha_{BS})^2+(\beta_{UE}-\beta_{BS})^2}$, and calculates the angle of the line connecting itself with the eNB with respect to the north direction as $$\gamma_{UE} = \arctan\left(\frac{\alpha_{UE}-\alpha_{BS}}{\beta_{UE}-\beta_{BS}}\right),$$

according to its longitude position and latitude position ($\alpha_{UE}$, $\beta_{UE}$). The communication device, after receiving the angle $\gamma_0$ the collimation line of the antenna with respect to the south direction, calculates its polar coordinate $\theta_{UE}=\gamma_{UE}-\gamma_0$. The communication device takes the index value of the grid where the polar coordinates ($r_{UE}$, $\theta_{UE}$) fall as the quantization value of the relative geographical location and transmits it to the eNB.

In addition, a method of quantizing separately can also be used. That is, three quantization tables are established respectively for the longitude, the latitude and the altitude, and the communication device uses these three quantization tables to quantize its relative geographical location. The implementation method is similar to the example in FIG. 6, and will not be repeated here.

When using a uniform geographical location information quantization table, i.e., the storage module 301 only stores one geographical location information quantization table, for example, the quantization level and number of bits can be determined according to the general accuracy requirement of the service and the statistical information. In the example where several landmarks uniformly distributed are specified in the cell as shown in FIG. 3, the communication device selects the landmark which is nearest in distance as the reference location. Since the landmarks are distributed uniformly, a uniform geographical location information quantization table can be used to perform quantization.

In addition, the storage module 301 can further stores multiple geographical location information quantization tables, and the relative location generation module 202 selects one of the tables serving as the basis for quantizing and encoding according to a predetermined criterion.

In an example, the storage module 301 stores multiple geographical location information quantization tables with different quantization granularities and/or sizes, and the relative location generation module 202 selects a geographical location information quantization table with a particular quantization granularity and/or size to quantize and encode the difference value. Wherein, the size refers to for example the code length.

For example, the relative location generation module 202 can adopt, according to the different deploying environment of the corresponding entity at the reference location, a quantization table with the corresponding granularity. For example, one entity is corresponding to one quantization table. Of course, even for the same entity, there may be a plurality of quantization tables with different granularities.

For example, the user device selects the quantization table according to its distance to the entity. To guarantee the signaling overhead, when the distance to the entity is farer, a quantization table with a coarser granularity can be adopted. On the contrary, when the distance to the entity is nearer, a quantization table with a finer granularity can be adopted. The communication module 203 transmits the serial number of the adopted quantization table simultaneously while transmitting the information of the relative location.

Figure 8:
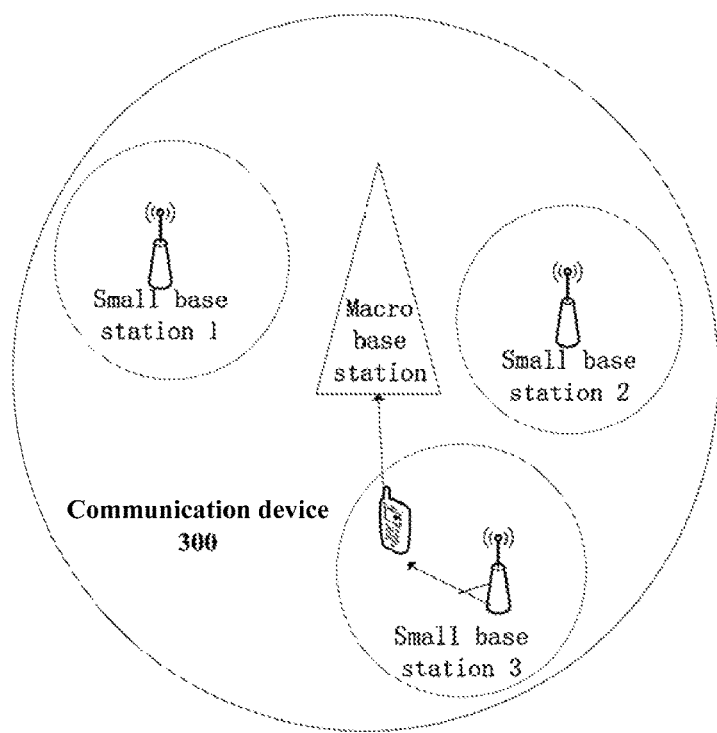
FIG. 8 is a diagram illustrating an example when the base stations of small cells are adopted as the candidate reference geographical locations.

FIG. 8 shows an example where the base stations of the small cells serve as the candidate reference geographical locations. Wherein, the macro base station knows the deploying positions of the small base stations in advance, and can notify the communication device 300 of the coordinates and physical cell identity (PCI) of each small base station (or selecting a part of base stations which are distributed uniformly) within the macro cell when the communication device 300 accesses in the network. When the communication device enters into the coverage range of a small base station, it can listen to the broadcast information of the small base station, which includes PCI of the small cell. When it is necessary to report the location information to the macro base station, the relative location generation module 202 for example generates the information of the relative geographical location by using the quantization table with respect to the small cell which the communication device is located in. Then, the communication module 203 reports the information of the relative geographical location and the PCI of the small cell to the macro base station.

In addition, the communication module 203 can further receive an indicator for indicating a geographical location information quantization table configured according to deploying environment of the reference geographical location, and the relative location generation module 202 quantizes and encodes the difference value between the absolute geographical location of the communication device and the reference geographical location by using the one of the multiple geographical location information quantization tables that corresponds to the indicator. In other words, the quantization table to be used is specified by outside such as the base station.

The Third Embodiment

Figure 9:
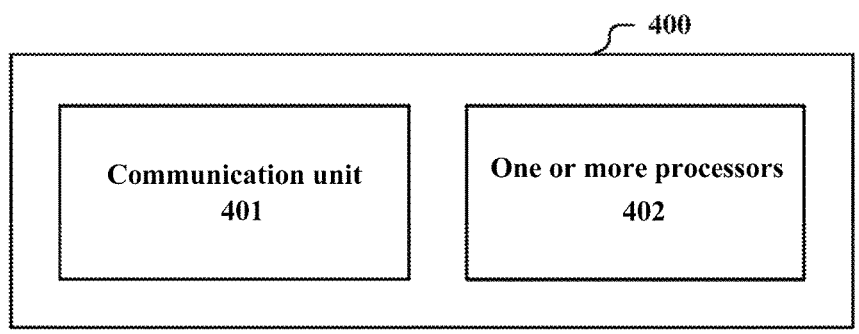
FIG. 9 is a structural block diagram illustrating the communication device for wireless communication systems according to an embodiment of the present application.

FIG. 9 illustrates a structural block diagram of the communication device 400 for wireless communication systems according to another embodiment of the present application, including: a communication unit 401, configured to receive information of a first relative geographical location, which is about the first relative geographical location of a communication object of the communication device 400 with respect to a reference geographical location; and one or more processors 402, configured to acquire, based on the information of the first relative geographical location and the information of the reference geographical location, a current geographical location of the communication object.

Wherein, the current geographical location of the communication object can be the current absolute geographical location of the communication object, or can be the relative geographical location of the communication object with respect to the communication device 400. The communication device 400 for example can be a base station device.

In an example, the communication device 400 is a mobile node, and the communication unit 401 is further configured to transmit, periodically or in an event-triggering manner, the information of the absolute geographical location of the communication device as the information of the reference geographical location. For example, when the displacement of the communication device 400 exceeds a predetermined degree, the transmitting is triggered.

The communication unit 401 can transmit the information of the reference geographical location through at least one of broadcast channel (BCCH) signaling, downlink control channel (PDCCH) signaling, connection management procedure RRC signaling mapped to downlink shared channel and control element information of media access layer (MAC). Further, the communication unit 401 can further interchange the information of the reference geographical location with another base station via X2 signaling.

Figure 10:
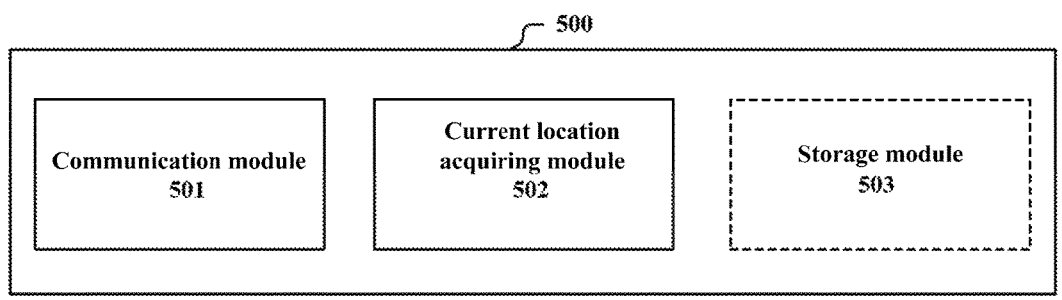
FIG. 10 is a block diagram illustrating the functional modules of the communication device for wireless communication systems according to an embodiment of the present application.

Correspondingly, FIG. 10 illustrates the corresponding block diagram of the functional modules of the communication device 400 (shown as the communication device 500 in FIG. 10). As shown in FIG. 10, the communication device 500 includes: a communication module 501, configured to receive information of a first relative geographical location, which is about the first relative geographical location of a communication object of the communication device 500 with respect to a reference geographical location; a current location acquiring module 502, configured to acquire, based on the information of the first relative geographical location and the information of the reference geographical location, a current geographical location of the communication object. Wherein, the communication module 501 can be implemented for example by the communication unit 401 in FIG. 9. The current location acquiring module 502 can be implemented for example by the one or more processors 402 in FIG. 9.

In an example, the current location acquiring module 502 determines an absolute geographical location of the communication device 500 as the reference geographical location and generates information of the reference geographical location, and the communication module 501 is configured to transmit the information of the reference geographical location to the communication object of the communication device 500. In this situation, the first relative geographical location is the relative geographical location of the communication object with respect to the communication device 500.

In another example, the communication device 500 acquires, at different time instants, information of the absolute geographical location of the communication object at respective time instants respectively, and the current location acquiring module 502 is further configured to determine the absolute geographical location of the communication object at a first time instant as the reference geographical location of the current time instant, and acquire a current absolute geographical location or a current relative geographical location of the communication object based on the information of the first relative geographical location and the information of the reference geographical location at current time instant. For example, the communication device 500 acquires the information of the absolute geographical location of the communication object at regular time intervals. For example, the first time instant can be some particular time instant such as the time instant when the communication object accesses into the base station and the communication device 500 can receive from the communication device the relative value of the geographical location of the communication object at each other time instant with respect to the geographical location at this time instant. In addition, the first time instant can also be a time instant which is iteratively updated, such as the time instant when the last receiving occurs, and relative values with respect to the location at the last time instant are received at respective time instants.

In still another example, the current location acquiring module 502 is further configured to determine multiple absolute geographical locations as candidate reference geographical locations, and generate information of candidate reference geographical locations containing the multiple absolute geographical locations and corresponding identifiers. The communication module 501 is configured to transmit the information of candidate reference geographical locations to the communication object of the communication device 500, and receive from the communication object an identifier for the reference geographical location selected by the communication object to be used by the current location acquiring module 502 to determine a current relative geographical location or absolute geographical location of the communication object. The communication object can selects one or more of the multiple candidate geographical locations as the reference geographical location. In the case of selecting more than one reference geographical locations, the communication module 501 can receive from the communication object multiple relative geographical locations, and the current location acquiring module 502 can select the most accurate one from them to calculate the absolute geographical location, or can calculate respectively and take the average value as the final absolute geographical location. Still taking FIGS. 3-4 as an example, the communication device 500 is provided as the central node A in the Figure. The communication device 500 transmits the information of the candidate reference geographical locations containing the absolute geographical locations of landmarks 1-4 and their corresponding identifiers to the communication device 200. After the communication device 200 performs the selection of the reference geographical location and the calculation of the relative geographical location, the communication module 501 of the communication device 500 receives from the communication device 200 the information of the first relative geographical location of the communication device 200 with respect to the landmark 2 and the ID of the landmark 2. The current location acquiring module 502 determines, based on the acquired information, the current absolute geographical location of the communication device 200, and further can also acquire the relative geographical location of the communication device 200 with respect to the communication device 500.

In yet another example, the current location acquiring module 502 is further configured to determine an absolute geographical location of a relay node on a communication link between the communication device 500 and the communication object as the reference geographical location, and the communication module 501 is configured to calculate a sum of the first relative geographical location and the absolute geographical location of the relay node to acquire the information of the current absolute geographical location of the communication object. Wherein, the relay node receives from the communication object the information of the first relative geographical location of the communication object with respect to the relay node and delivers it to the communication device 500, so that the communication device is capable of acquiring the current absolute geographical location of the communication object.

Exemplarily, the current location acquiring module 502 can be configured to calculate a sum of the first relative geographical location and the reference geographical location to acquire the information of the current absolute geographical location of the communication object.

As shown by a dashed line block in FIG. 10, the communication device 500 can further include a storage module 503, configured to store one or more geographical location information quantization tables, and the current location acquiring module 502 is further configured to decode, based on a corresponding geographical location information quantization table, the information of the first relative geographical location to determine the first relative geographical location. The storage module 503 can also be implemented for example by the one or more processors 402 in FIG. 9. The description about the geographical location information quantization table can be found in the second embodiment and will not be repeated here. In addition, a manner corresponding to the encoding can be applied to the decoding, so that in the case of using the geographical location information quantization table which is used in quantizing, the information of the first relative geographical location of the communication object can be restored.

In an example, the storage module 503 stores multiple geographical location information quantization tables with different quantization granularities and/or sizes, and the current location acquiring module 502 selects a geographical location information quantization table with a particular quantization granularity and/or size to decode the information of the first relative geographical location. Wherein, the selection can be performed based on various criteria.

The current location acquiring module 502 selects a first geographical location information quantization table configured corresponding to deploying environment of the reference geographical location. For example, as stated above, the current location acquiring module 502 can adopt a quantization table with a corresponding granularity according to the deploying environment of the corresponding entity at the reference location. Of course, with respect to the same entity, there also may be quantization tables with multiple different granularities, and the quantization table is selected for example according to the distance between the communication object and the entity.

Wherein, the communication module 501 is further configured to transmit an indicator for indicating the first geographical location information quantization table configured corresponding to the deploying environment of the reference geographical location to the communication object. Thus, the communication object can select an appropriate geographical location information quantization table to quantize and encode the information of the relative geographical location to be transmitted.

In addition, it is also possible to make the communication module 501 receive from the communication object an indicator corresponding to the geographical location information quantization table which is to be used by the communication object to quantize and encode, and select the corresponding geographical location information quantization table according to this indicator, so as to accomplish the correct decoding.

The Fourth Embodiment

It is apparent that some processing or methods are also disclosed in the description above on the communication device for wireless communications according to embodiments of the present invention. Below, the summary of the methods is described without repeating the details which are already discussed above, however, it should be noted that although disclosed in the description of the communication device for wireless communications, the methods do not certainly employ or are not certainly executed by the aforementioned components. For instance, embodiments of the communication device for wireless communications may be partially or completely achieved by hardware and/or firmware, and the communication method for the communication device for wireless communications described below may be fully achieved by a computer-executable program, although the methods may employ the hardware and/or firmware of the communication device for wireless communications.

Figure 11:
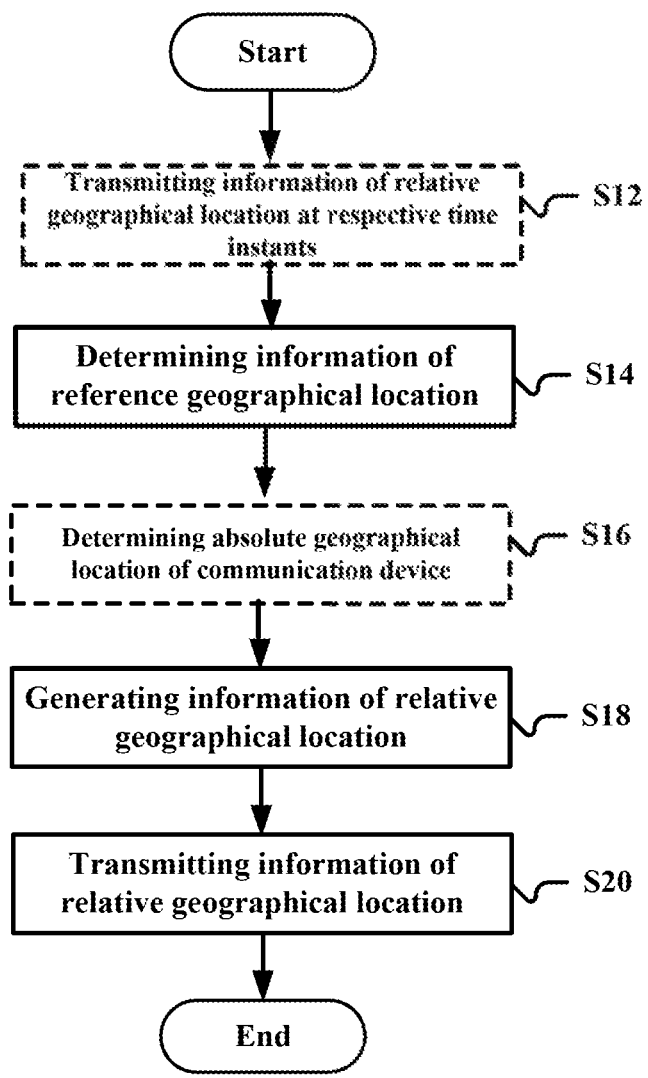
FIG. 11 is a flowchart illustrating the communication method for wireless communication systems according to an embodiment of the present application.

FIG. 11 illustrates a flowchart of the method for a communication device for wireless communication systems according to an embodiment of the present application. The method includes the following steps: determining information of a reference geographical location used for the communication device (S14); generating, based on the information of the reference geographical location and a current absolute geographical location of the communication device, information of a relative geographical location of the communication device with respect to the reference geographical location (S18); and transmitting the information of the relative geographical location to a predetermined communication object (S20).

Wherein, as shown by a dashed line block in FIG. 11, before performing the step S18, the method can further include the following step S16: determining an absolute geographical location of the communication device. For example, the step can be performed by a GPS module.

In an example, information of a geographical location of the predetermined communication object is received in step S14, and the geographical location of the predetermined communication object is determined as the reference geographical location.

In another example, the above mentioned method further includes a step S12: transmitting, at different time instants, the information of the relative geographical locations of the communication device at respective time instants to the predetermined communication objects respectively. In step S14, the absolute geographical location of the communication device at a first time instant is determined as the reference geographical location of the current time instant. The first instance can be a particular time instant when the communication object access in the network, or can be a time instant which is iteratively updated, such as the time instant when the last transmitting occurs.

In still another example, in step S14, information of multiple absolute geographical locations serving as candidate reference geographical locations and corresponding identifiers are received, and one of the multiple absolute geographical locations is selected as the reference geographical location based on distances between the multiple absolute geographical locations and the communication device.

In an example, in step S14, information of a geographical location of a relay node on a communication link between the communication device and the predetermined communication object is received, and the geographical location of the relay node is determined as the reference geographical location. In addition, the relay node can also be not in the above mentioned communication link.

In step S18, a difference value between the current absolute geographical location of the communication device and the reference geographical location can be calculated, and the difference value is quantized and encoded to generate the information of the relative geographical location.

As an example, the communication device can be provided with a storage unit therein, which is configured to store one or more geographical location information quantization tables, and in step S18 the difference value is quantized and encoded based on a corresponding geographical location information quantization table. Wherein, these geographical location information quantization tables can be stored in advance when leaving the factory according to the communication protocol, or be received from the base station or the central node after accessing in the network and stored.

The storage unit can store multiple geographical location information quantization tables with different quantization granularities and/or sizes. In step S18, a geographical location information quantization table with a particular quantization granularity and/or size is selected to quantize and encode the difference value.

In an example, in step S18, an indicator indicating a geographical location information quantization table configured according to deploying environment of the reference geographical location can be received, the difference value between the absolute geographical location of the communication device and the reference geographical location is quantized and encoded by using the one of the multiple geographical location information quantization tables that corresponds to the indicator.

Figure 12:
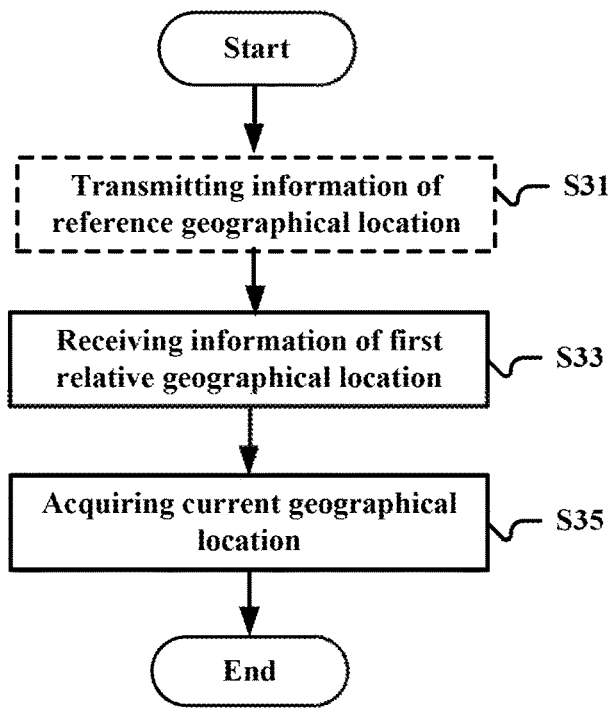
FIG. 12 is a flowchart illustrating the communication method for wireless communication systems according to another embodiment of the present application.

FIG. 12 illustrates a flowchart of the method for a communication device for wireless communication systems according to another embodiment of the present application. The method includes the following steps: receiving information of a first relative geographical location which is about the first relative geographical location of a communication object of the communication device with respect to a reference geographical location (S33); and acquiring based on the information of the first relative geographical location and the information of the reference geographical location, a current geographical location of the communication object.

In an example, an absolute geographical location of the communication device is determined as the reference geographical location and information of the reference geographical location is generated. As shown by a dashed line block in FIG. 12, the method further includes step S31: transmitting the information of the reference geographical location to the communication object of the communication device.

In another example, the communication device acquires, at different time instants, information of the absolute geographical location of the communication object at respective time instants respectively, determines the absolute geographical location of the communication object at a first time instant as the reference geographical location of the current time instant, and acquires, based on the information of the first relative geographical location and the information of the reference geographical location at current time instant, a current absolute geographical location or a current relative geographical location of the communication object in step S35.

In still another example, multiple absolute geographical locations is determined as candidate reference geographical locations, and information of candidate reference geographical locations containing the multiple absolute geographical locations and corresponding identifiers is generated. In step S31, the information of candidate reference geographical locations is transmitted to the communication object of the communication device. In step S33, an identifier for the reference geographical location selected by the communication object is receive from the communication object, to be used in step S35 to determine a current relative geographical location or absolute geographical location of the communication object.

In an example, an absolute geographical location of a relay node on a communication link between the communication device and the communication object is determined as the reference geographical location. In step S33, the information of the first relative geographical location is received from the relay node, and in step S35 a sum of the first relative geographical location and the absolute geographical location of the relay node is calculated to acquire the information of the current absolute geographical location of the communication object.

In step S35, a sum of the first relative geographical location and the reference geographical location is calculated to acquire the information of the current absolute geographical location of the communication object.

As an example, the communication device can be provided with a storage unit therein, which is configured to store one or more geographical location information quantization tables. In step S35, the information of the first relative geographical location is decoded based on a corresponding geographical location information quantization table to determine the first relative geographical location.

For example, the storage unit can store multiple geographical location information quantization tables with different quantization granularities and/or sizes. In step S35, a geographical location information quantization table with a particular quantization granularity and/or size is selected to decode the information of the first relative geographical location.

Wherein, in step S35, a first geographical location information quantization table configured corresponding to deploying environment of the reference geographical location can be selected.

In addition, in step S31, an indicator for indicating the first geographical location information quantization table configured corresponding to the deploying environment of the reference geographical location can be transmitted to the communication objection, so that the communication device and the communication object use the same geographical location information quantization table to perform encoding and decoding.

In step S31, the information of the reference geographical location is transmitted through at least one of broadcast channel signaling, downlink control channel signaling, connection management procedure RRC signaling mapped to downlink shared channel and control element information of media access layer.

In an example, the above mentioned communication device is a mobile node, and in step S31 the information of the absolute geographical location of the communication device is transmitted periodically or in an event-triggering manner to serve as the information of the reference geographical location.

The above mentioned methods according to the present application allows the communication device and the communication object to deliver the information of the relative location between them with as litter overhead as possible, and thus at least one of the following can be achieved: assisting in operations such as cell switching, beam forming, user scheduling, pilot allocating and so on, further improving the performance of the wireless networks.

It is to be noted that, the above mentioned methods can be adopted separately or in combination, the details of which have been described in detail in the first to the third embodiment and will not be repeated here.

Application Instances

To facilitate understanding, several application examples of the above mentioned communication device and communication method are given below. However, it is to be understood that these example are just for the purpose of specification, but are not limiting. The communication device and communication method according to the present application can be applied to any other situation where they are required.

I. Small Cell Selection in Heterogeneous Network

In this example, the macro base station is for example the communication device 400 or 500, and the user device (UE) is for example one of the communication device 100-300. The macro base station acquires the relative geographical location of the user device and calculates the absolute geographical location of the UP based on the relative geographical location; generates, based on a pre-stored small cell base station geographical location table and the absolute geographical location of the UE, a list of small cell base stations which are near to the UE; notifies the UE of the generated list of small cell base stations to be used by the UE to rapidly select a neighboring small cell base station to access in.

II. Point to Point Communication Pair

Similarly, in this example, the macro base station is for example the communication device 400 or 500, and the user device (UE) to be paired is for example one of the communication device 100-300. The macro base station acquires the relative geographical locations of all the user devices in the cell which are to be paired, acquires the relative distances between the users to be paired, and perform the point to point communication pairing at least based on the relative distances. Then, the macro base station notifies the UE of the UE pairing information, so that the UE can use this pairing information to perform terminal to terminal transmitting.

III. Measurement in Homogeneous Cells

Similarly, in this example, the base station is for example the communication device 400 or 500, and the user device (UE) is for example one of the communication device 100-300. Wherein, the base station stores therein the absolute geographical locations of the adjacent base stations. The base station acquires the relative geographical location of the UE and then calculates its absolute geographical location. Moreover, the base station calculates the relative distances between the UE and the adjacent base stations. The base station judges a candidate base station for the UE at least based on the relative distances, and notifies the UE of the judged candidate base station, so that the UE performs measurement and reports the measurement results.

IV. Pilot Allocating

Similarly, in this example, the base station is for example the communication device 400 or 500, and the user device (UE) is for example one of the communication device 100-300. To avoid pilot pollution, the cell is divided into multiple pilot geographical divisions, each of which use a set of pilots, and the adjacent pilot geographical divisions in adjacent cells should avoid using the same set of pilots. On this premise, the base station acquires the relative geographical location of the UE, and allocates the pilot according to the pilot geographical division where the relative geographical location is located. Then, the base station notifies the UE of the information of pilot allocating.

The basic principle of the present in has been described above in conjunction with particular embodiments. However as can be appreciated by those ordinarily skilled in the art, all or any of the steps or components of the method and apparatus according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1300 shown in FIG. 13) from a storage medium or network, wherein the computer is capable of implementing various functions when installed with various programs.

Figure 13:
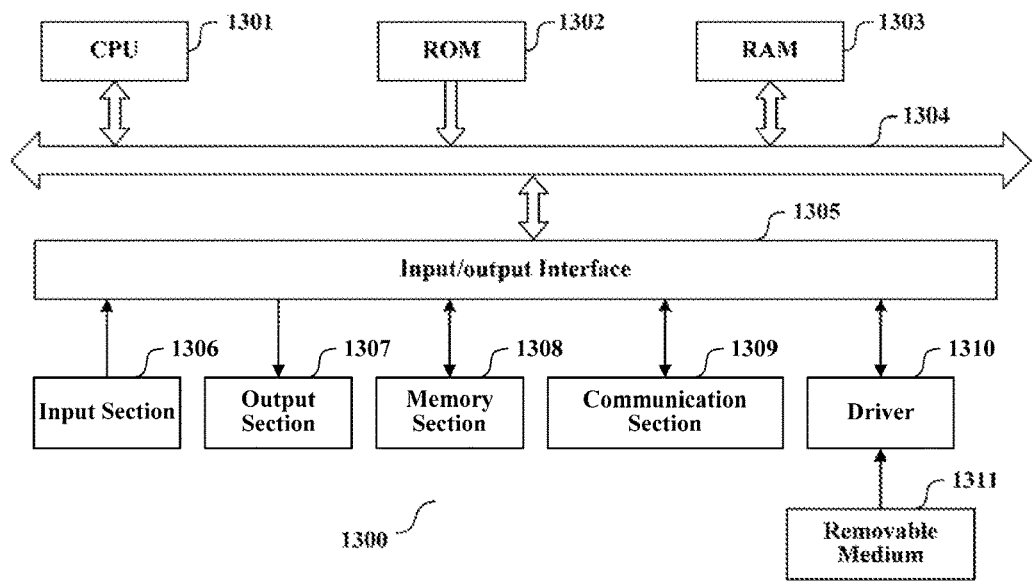
FIG. 13 is an exemplary block diagram illustrating the structure of a general purpose personal computer capable of realizing the method and/or apparatus and/or system according to the embodiments of the present invention.

In FIG. 13, a central processing unit (CPU) 1301 executes various processing according to a program stored in a read-only memory (ROM) 1302 or a program loaded to a random access memory (RAM) 1303 from a memory section 1308. The data needed for the various processing of the CPU 1301 may be stored in the RAM 1303 as needed. The CPU 1301, the ROM 1302 and the RAM 1303 are linked with each other via a bus 1304. An input/output interface 1305 is also linked to the bus 1304.

The following components are linked to the input/output interface 1305: an input section 1306 (including keyboard, mouse and the like), an output section 1307 (including displays such as a cathode ray tube (CRT), a liquid crystal display (LCD), a loudspeaker and the like), a memory section 1308 (including hard disc and the like), and a communication section 1309 (including a network interface card such as a LAN card, modem and the like). The communication section 1309 performs communication processing via a network such as the Internet. A driver 1310 may also be linked to the input/output interface 1305, if needed. If needed, a removable medium 1311, for example, a magnetic disc, an optical disc, a magnetic optical disc, a semiconductor memory and the like, may be installed in the driver 1310, so that the computer program read therefrom is installed in the memory section 1308 as appropriate.

In the case where the foregoing series of processing is achieved through software, programs forming the software are installed from a network such as the Internet or a memory medium such as the removable medium 1311.

It should be appreciated by those skilled in the art that the memory medium is not limited to the removable medium 1311 shown in FIG. 13, which has program stored therein and is distributed separately from the apparatus so as to provide the programs to users. The removable medium 1311 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1302 and the memory section 1308 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. A method for a communication system, comprising:
providing assistance information including reference geographical locations and IDs of multiple transmission points;
determining, by circuitry of a user equipment, relative distances between the reference geographical locations of the multiple transmission points and an absolute geographical location of the user equipment respectively by calculating differences between the reference geographical locations of the multiple transmission points and the absolute geographical location of the user equipment;
encoding the determined relative distances to generate information indicating the relative distances;
reporting, by the circuitry, the information indicating the relative distances and information indicating the corresponding IDs of the multiple transmission points respectively; and
determining, by a server, a current geographical location of the user equipment based on the reported relative distances determined by the circuitry of the user equipment and the reported IDs of the multiple transmission points, each of the reported relative distances corresponding to each of the reported IDs of the multiple transmission points respectively, wherein
the method further comprises quantizing the relative distances between the reference geographical locations of the multiple transmission points and the absolute geographical location of the user equipment to generate the reported information.

2. The method according to claim 1, wherein the reference geographical locations are geographical coordinates.

3. The method according to claim 1, wherein the transmission points are small base stations or relay nodes.

4. The method according to claim 1, further comprising pairing two user equipment for point-to-point communication based on the determined current geographical location.

5. The method according to claim 1, further comprising determining a candidate base station for the user equipment to measure based on the determined current geographical location.

6. The method according to claim 1, further comprising dividing a serving coverage into multiple geographical zones;
allocating a resource to the user equipment based on the determined current geographical location and the multiple geographical zones.

7. The method according to claim 1, wherein the absolute geographical location of the user equipment is obtained by a GPS module of the user equipment.

8. A communication system, comprising:
first circuitry configured to provide assistance information including reference geographical locations and IDs of multiple transmission points;
second circuitry of a server configured to determine a current geographical location of a user equipment based on information reported by third circuitry of the user equipment; and
the third circuitry of the user equipment configured to
determine relative distances between the reference geographical locations of the multiple transmission points and an absolute geographical location of the user equipment respectively by calculating differences between the reference geographical locations of the multiple transmission points and the absolute geographical location of the user equipment, and
encode the determined relative distances to generate information indicating the relative distances;
report the information indicating the relative distances and information indicating the corresponding IDs of the multiple transmission points respectively, wherein
the second circuitry is configured to determine the current geographical location of the user equipment based on the reported relative distances determined by the third circuitry of the user equipment and the reported IDS of the multiple transmission points, each of the reported relative distances corresponding to each of the reported IDs of the multiple transmission points respectively, and
the third circuitry is further configured to quantize the relative distances between the reference geographical locations of the multiple transmission points and the current geographical location of the user equipment to generate the reported information.

9. The communication system according to claim 8, wherein the reference geographical locations are geographical coordinates.

10. The communication system according to claim 8, wherein the transmission points are small base stations or relay nodes.

11. The communication system according to claim 8, further comprising:
fourth circuitry configured to pair two user equipment for point-to-point communication based on the determined current geographical location.

12. The communication system according to claim 8, further comprising:
fifth circuitry configured to determine a candidate base station for the user equipment to measure based on the determined current geographical location.

13. The communication system according to claim 8, further comprising
- sixth circuitry configured to divide a serving coverage into multiple geographical zones; and
- seventh circuitry configured to allocate a resource to the user equipment based on the determined current geographical location and the multiple geographical zones.

14. A method for a communication system, comprising:
- providing assistance information including reference geographical locations and IDs of multiple transmission points;
- determining, by circuitry of a user equipment, relative distances between the reference geographical locations of the multiple transmission points and an absolute geographical location of the user equipment respectively by calculating differences between the reference geographical locations of the multiple transmission points and the absolute geographical location of the user equipment;
- encoding the determined relative distances to generate information indicating the relative distances;
- reporting, by the circuitry, the information indicating the relative distances and information indicating the corresponding IDs of the multiple transmission points respectively;
- determining, by a server, a current geographical location of the user equipment based on the reported relative distances determined by the circuitry of the user equipment and the reported IDs of the multiple transmission points, each of the reported relative distances corresponding to each of the reported IDs of the multiple transmission points respectively; and
- pairing two user equipment for point-to-point communication based on the determined current geographical location.

15. A communication system, comprising:
- first circuitry configured to provide assistance information including reference geographical locations and IDs of multiple transmission points;
- second circuitry of a server configured to determine a current geographical location of a user equipment based on information reported by third circuitry of the user equipment;
- the third circuitry of the user equipment configured to
  - determine relative distances between the reference geographical locations of the multiple transmission points and an absolute geographical location of the user equipment respectively by calculating differences between the reference geographical locations of the multiple transmission points and the absolute geographical location of the user equipment, and
  - encode the determined relative distances to generate information indicating the relative distances;
  - report the information indicating the relative distances and information indicating the corresponding IDs of the multiple transmission points respectively; and
- fourth circuitry configured to pair two user equipment for point-to-point communication based on the determined current geographical location, wherein
- the second circuitry is configured to determine the current geographical location of the user equipment based on the reported relative distances determined by the third circuitry of the user equipment and the reported IDS of the multiple transmission points, each of the reported relative distances corresponding to each of the reported IDs of the multiple transmission points respectively.

* * * * *